UNITED STATES PATENT OFFICE.

GEORGE KELLY, OF HINSDALE, ILLINOIS.

CEMENTITIOUS BINDER OR LIQUID GLUE.

No. 830,329.

Specification of Letters Patent.

Patented Sept. 4, 1906.

Application filed October 30, 1905. Serial No. 285,179.

*To all whom it may concern:*

Be it known that I, GEORGE KELLY, a citizen of the United States, residing at Hinsdale, in the county of Dupage and State of Illinois, have invented a new and useful Cementitious Binder or Liquid Glue, of which the following is a specification.

This invention relates to a novel cementitious binder or liquid glue and the method of manufacturing the same.

The object is to provide a novel and inexpensive composition that can be readily made, will remain in a liquid state while inclosed, will dry quickly when applied to an article and exposed to the outer air, and will have excellent and durable holding qualities after it has set or hardened.

The improved composition consists of substantially five per cent. of elastic vegetable gum and ninety-five per cent. of liquid glass. Experience has demonstrated that rubber or a gum secured from Pontianak, Borneo, and commercially known as "pontianak" are preferable. The combination of these two gums has also given excellent results. Liquid glass—namely, silicate of sodium, silicate of potassium, or the like—is employed and the proper proportion of gum is placed therein. The said liquid glass in itself acts as a solvent on the rubber or other gum, and after the same has dissolved the solution is preferably passed through a filter or other suitable strainer.

The composition constitutes an excellent glue or binder, having all the characteristics noted above, and as the two ingredients combine without the nceessity of any other solvent for the gum the material can be manufactured expeditiously and at very small cost.

I believe that I am the first to combine liquid glass and vegetable gum or rubber so that the former serves as a solvent for the latter and do not wish to be limited to the use which may be made of the composition formed by the union of these substances. For instance, the composition may be employed as a glue or binder or be used as an ingredient of other compositions, an example of which is described in a companion application for patent filed of even date herewith.

Having thus described my invention, what I claim as new, and desire to secure by Letters Patent, is—

1. A cementitious binder or glue composed of rubber dissolved in and by liquid glass.

2. A liquid cementitious binder or glue composed of an elastic vegetable gum dissolved in and by liquid glass.

3. A cementitious binder or liquid glue composed of rubber dissolved in and by liquid glass.

4. A cementitious binder or liquid glue composed of substantially ninety-five per cent. of liquid glass and substantially five per cent. of rubber in solution therewith.

In testimony that I claim the foregoing as my own I have hereto affixed my signature in the presence of two witnesses.

GEORGE KELLY.

Witnesses:
JOHN H. SIGGERS,
S. GEORGE TATE.